No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 1.
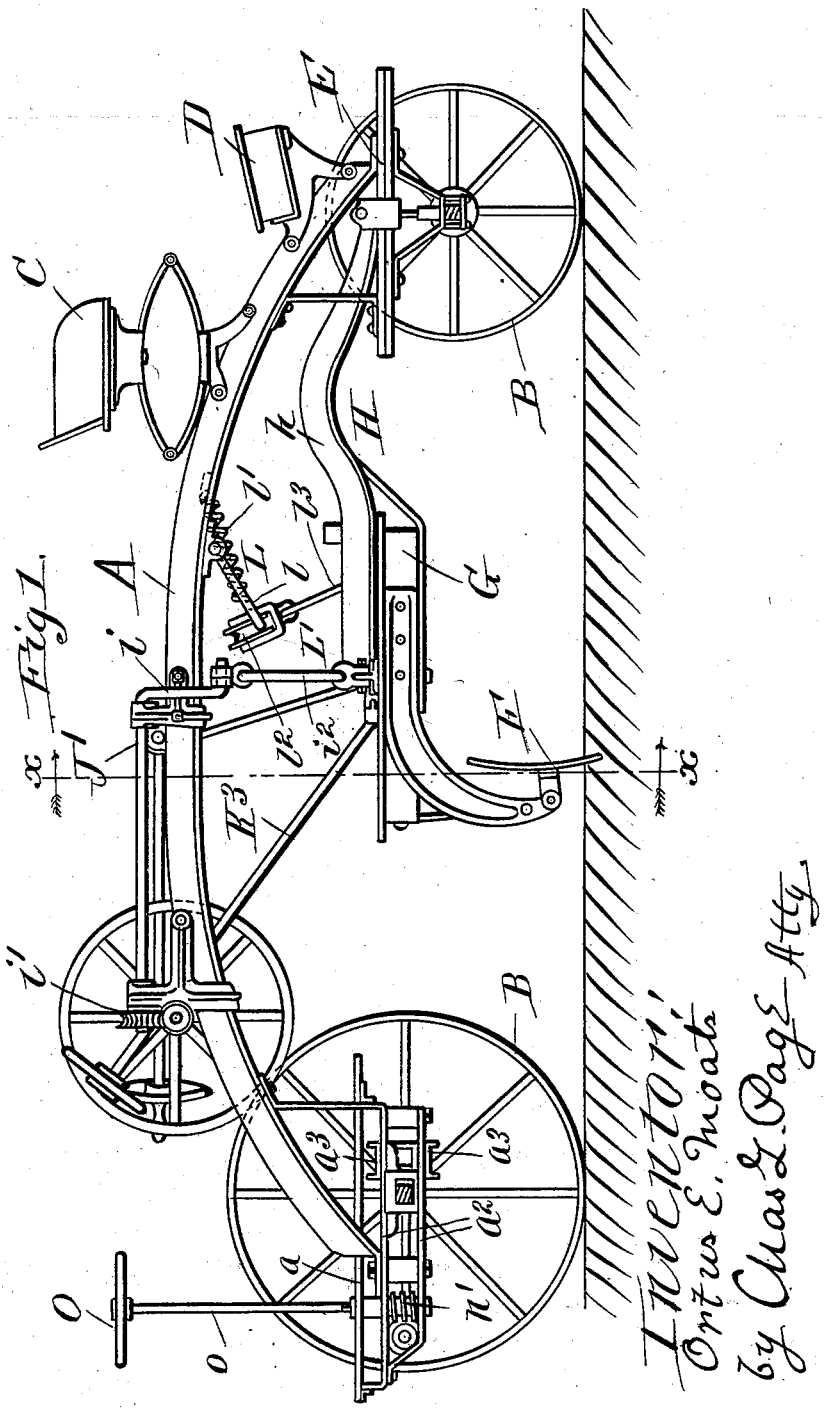

No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 2.
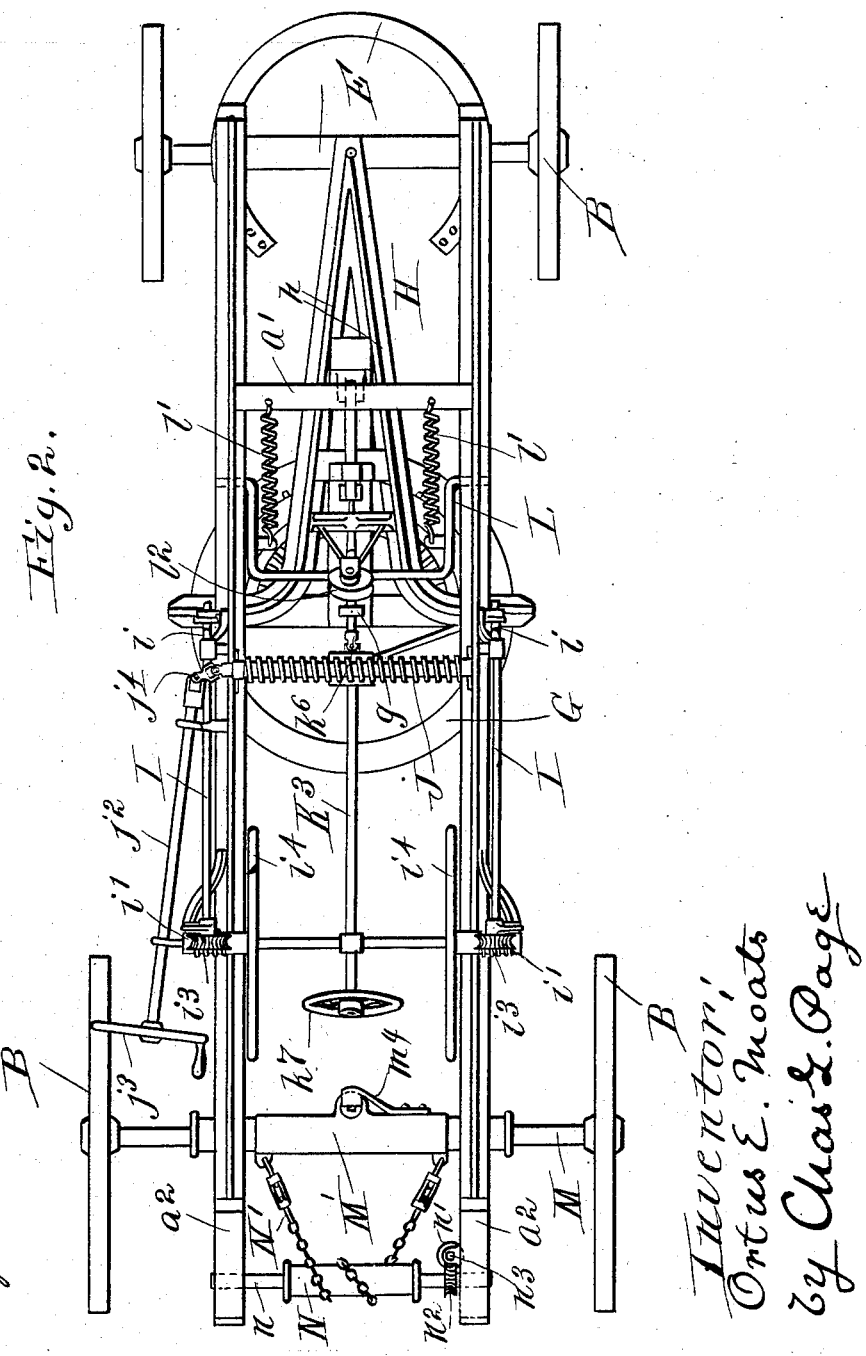

No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 3.
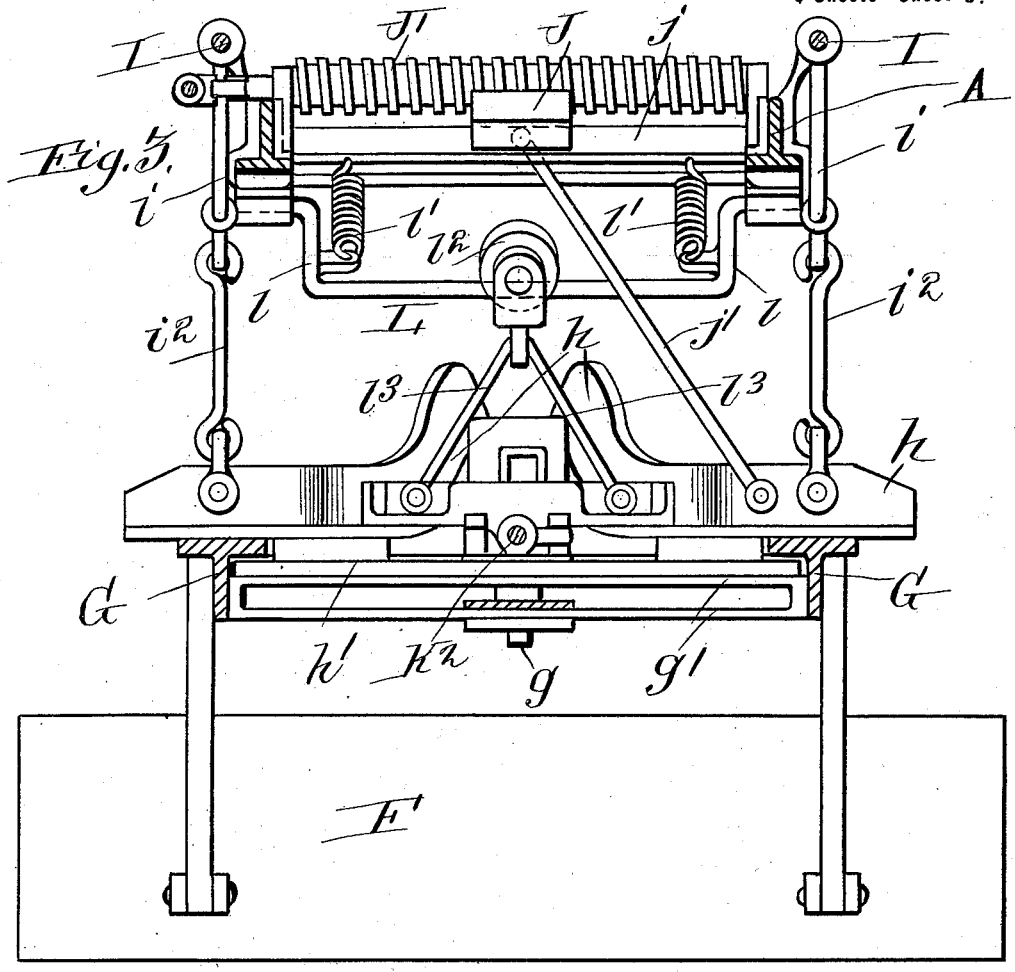
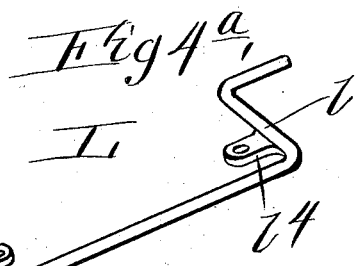
Witnesses:
A. F. Dinand
Agnes A. Devine
Inventor,
Ortus E. Moats,
by Chas L. Page Atty.

No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 4.
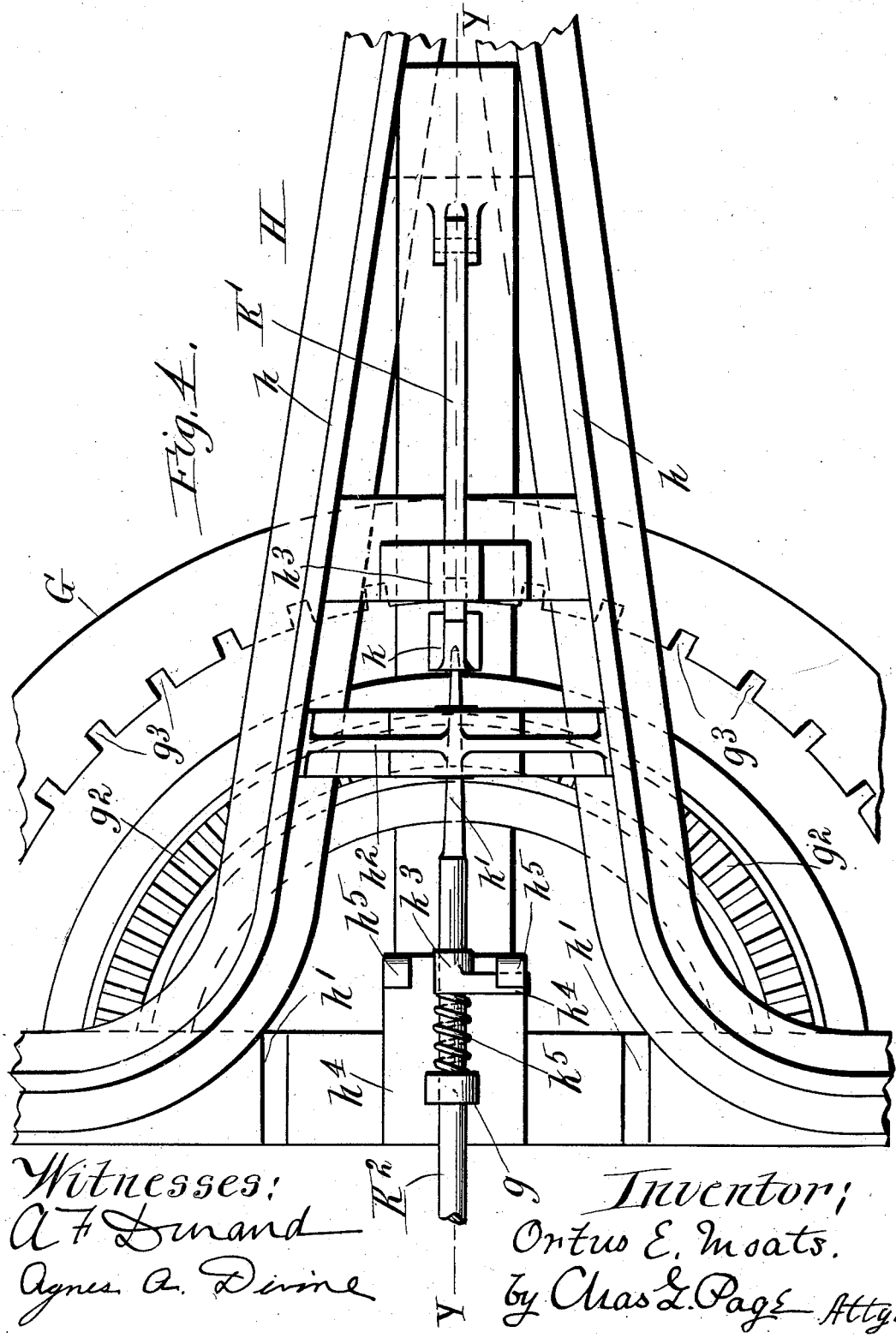

No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 5.
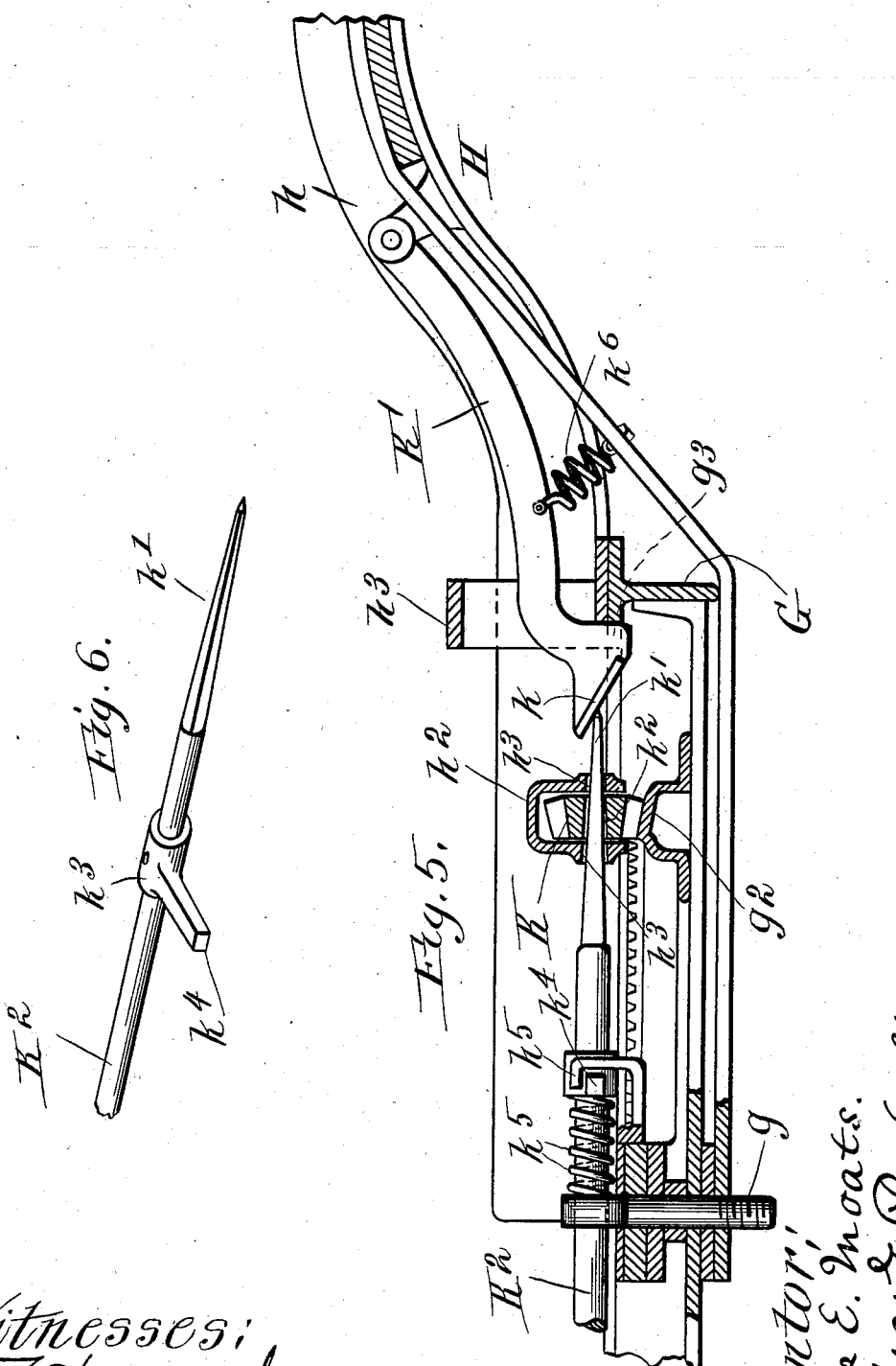

No. 655,260. Patented Aug. 7, 1900.
O. E. MOATS.
MACHINE FOR MAKING AND REPAIRING ROADS.
(Application filed Dec. 14, 1899.)
(No Model.) 6 Sheets—Sheet 6.
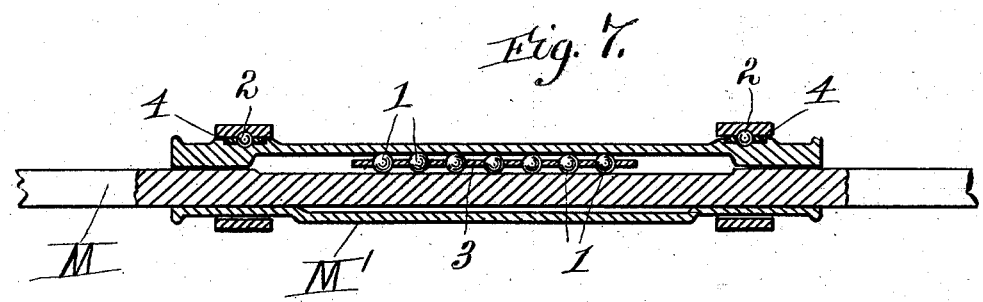
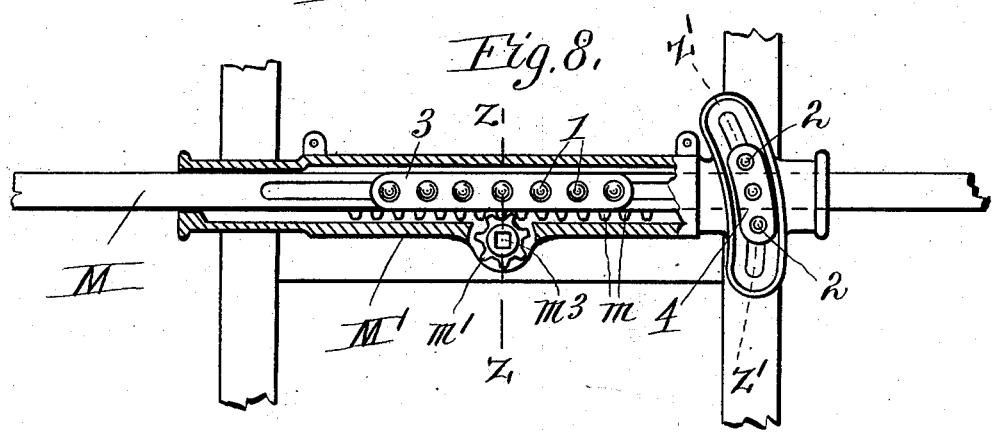
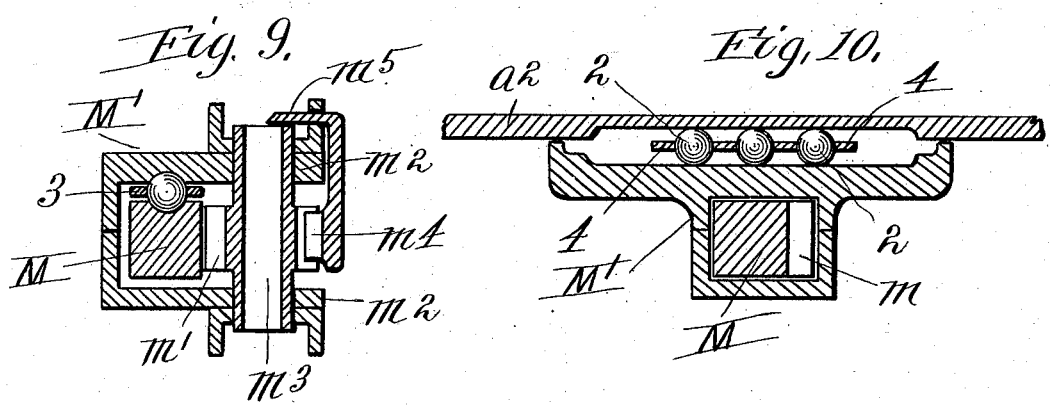
Witnesses:
A. F. Durand
Agnes A. Devine
Inventor:
Ortus E. Moats.
by Chas. L. Page Atty.

UNITED STATES PATENT OFFICE.

ORTUS E. MOATS, OF HARVEY, ILLINOIS, ASSIGNOR TO FREDERICK C. AUSTIN, OF CHICAGO, ILLINOIS.

MACHINE FOR MAKING AND REPAIRING ROADS.

SPECIFICATION forming part of Letters Patent No. 655,260, dated August 7, 1900.

Application filed December 14, 1899. Serial No. 740,328. (No model.)

*To all whom it may concern:*

Be it known that I, ORTUS E. MOATS, residing at Harvey, in the county of Cook, State of Illinois, have invented a certain new and useful Improvement in Machines for Making and Repairing Roads, of which the following is a specification.

My invention relates to machines which are employed for scraping and building up roadways and which are commonly known as "road-machines."

The objects of my invention are to generally simplify and improve the construction of road-machines, to improve the construction and mode of adjusting the long rear axle, to reduce friction between the rear axle and the body-frame, to improve the method of adjusting and operating the scraper-blade, to provide improved means for locking the scraper-blade at different angles, to provide an improved spring device for facilitating the raising and lowering of the scraper-blade, and to provide certain details and features of improvement tending to increase the general efficiency and to render a machine of this character serviceable and thoroughly reliable.

To the attainment of the foregoing and other useful ends my invention consists in matters hereinafter set forth and claimed.

In the accompanying drawings, Figure 1 is a side elevation of a road-machine embodying the principles of my invention. Fig. 2 is a plan of the machine shown in Fig. 1, the rear platform or footboard, the driver's seat, and foot-rest being removed. Fig. 3 is a transverse section on line $x\ x$ in Fig. 1. Fig. 4 is an enlarged plan of the forward portion of the turn-table upon which the scraper-blade is mounted and shows the device for locking the turn-table to the draw-bar. Fig. 4$^a$ is a perspective of the double crank L. Fig. 5 is a section on line $y\ y$ in Fig. 4. Fig. 6 is a perspective of the device for lifting the latch which locks the turn-table to the draw-bar. Fig. 7 is a longitudinal vertical section through the rear axle and the box or sleeve in which the axle slides. Fig. 8 is a plan of the axle and sleeve shown in Fig. 7, a portion of the sleeve being shown in horizontal section. Fig. 9 is a section on line $z\ z$ in Fig. 8. Fig. 10 is a section on line $z'\ z'$ in Fig. 8.

The road-machine thus illustrated comprises an arched body-frame A, which is supported upon front and rear vehicle-wheels B. A driver's seat C and a foot-rest D are provided and preferably arranged upon the body-frame at points substantially above the forward axle. The said axle is preferably connected with the body-frame through the medium of a fifth-wheel device E, and it is obvious that the draft appliances, which are not shown, may be of any known or approved form. The transversely-arranged scraper-blade F is preferably supported from a turn-table G. This turn-table is pivotally connected by means of a bolt or pin $g$ with the rear portion of the draw-bar H, which latter is preferably composed of a couple of beams $h$, having their forward ends joined and pivotally connected with the fifth-wheel device E. The beams $h$ have their rear end portions turned out so as to project laterally and overhang the sides of the turn-table, as shown in Figs. 2, 3, and 4, and these rear end portions of the beams are connected by a bar or beam $h'$. The said bolt or pin $g$ is inserted through this bar or beam $h'$ and also through bars $g'$, which are rigid with the turn-table, and with this construction the turn-table is, as stated, pivoted to the rear end of the draw-bar and of course capable of rotation about a vertical axis.

A platform $a$ is provided at the rear of the machine, and in order to permit the attendant standing upon this platform to raise and lower the blade at will I provide the following arrangement:

Mounted in suitable bearings at either side of the body-frame are a couple of longitudinally-arranged crank-shafts I. Each crank-shaft has its forward end provided with a crank-arm $i$ and its rear end provided with a worm-wheel $i'$. The said crank-arms are connected with the rear end portions of the beam $h$, preferably by means of rods or links $i^2$, and each worm-wheel is arranged to engage a worm $i^3$ on the hub of a hand-wheel $i^4$. These hand-wheels are mounted for independent rotation at opposite sides of the frame and are, it will be observed, within easy reach of the attendant. By rotating the hand-wheels the blade can be either raised or lowered, the cranks $i$ being swung downward to lower the blade, as shown in the drawings, and upward to lift the blade, and it being understood that during such vertical adjustment of the blade the draw-bar H swings up or down, as the case may be, about its pivotal connection with the forward running-gear. In this way the attendant standing on the rear platform can, as stated, raise and lower the blade at will, and the worm-gearing serves to lock the blade in any desired position.

In addition to a vertical adjustment the blade is, together with the turn-table, capable of a side shift or lateral adjustment. This lateral adjustment of the blade and turn-table may be accomplished in any suitable manner; but as a simple and effective arrangement I provide a block J, which slides upon a transversely-arranged beam $j$ and which is connected by a rod $j'$ with the outturned rear end portion of one of the beams $h$. The upper side of this sliding block is threaded and arranged to engage the under side of a worm J', which latter is arranged to extend across the body-frame A. This tranversely-arranged screw or worm is mounted for rotation in suitable bearings and when rotated causes the block J to slide along the way afforded by the beam $j$. The shifting of the block along the said way operates to swing the turn-table and blade to one side or the other, according to the direction in which the screw is turned, and it will be seen that the screw itself locks the block at any point on the beam. A hand-wheel shaft $j^2$ is provided and arranged to extend rearwardly to a point within reach of the operator, at which point the shaft is provided with a hand-wheel $j^3$. The said shaft is mounted in suitable bearings and has its forward end connected with the worm or screw through the medium of a universal joint $j^4$. In this way the attendant can at will and by rotating the said wheel swing the blade over to either side, and at this juncture it will be seen that the means thus provided for shifting the blade laterally do not in any way interfere with the vertical adjustment of the same, as the rod $j'$ is arranged at an angle and connected in such manner that it swings up or down when the blade and turn-table are raised or lowered.

Rotation of the turn-table for the purpose of varying the angle of the blade may be effected in any suitable manner; but as a matter of further and special improvement I provide the following simple and effective arrangement:

Suitably secured to the turn-table is a rack or segment $g^2$, and the forward portion of the turn-table is provided with notches $g^3$. A pinion K, which is housed in a casting $h^2$, secured to the draw-bar H, engages the said rack or segment, and a swinging arm or latch $k'$, having a beveled end $k$, is pivoted to the said draw-bar and arranged to engage the notches $g^3$. A guard $h^3$, secured to the draw-bar, serves to prevent lateral swing on the part of the latch, or, in other words, to relieve the latch from all lateral strain, and a spring $k'$ holds the said latch or detent normally down. The shaft $k^2$, which has a bearing in the upper end of the bolt $g$, is capable of end shift or longitudinal movement and is provided with a squared and tapered end portion $k'$. This tapered end portion of the said shaft extends through round openings $h^3$ in the housing $h^2$ and engages a square opening $k^2$ in the pinion K. A sleeve $k^3$, provided with an arm $k^4$, is secured upon the shaft K$^2$, and between said sleeve and the upper end of the bolt $g$ I arrange a coil-spring $k^5$. The plate or bracket $h^4$, which is secured to the rear portion of the draw-bar, has its forward portion provided with a couple of upwardly-extending and hook-shaped projections $h^5$, and the spring $k^5$ holds the arm $k^4$ normally in engagement with one or the other of these two projections. (See Figs. 4 and 5.) The shaft K$^2$ is connected with the rearwardly-extending shaft K$^3$ by means of a universal joint $k^6$, and the rear end of the shaft K$^3$ is provided with a hand-wheel $k^7$. This hand-wheel is, it will be observed, within reach of the operator, and the manner in which this arrangement is employed for locking and rotating the turn-table is as follows: First, the shaft is shifted rearward to an extent to disengage the arm $k^4$ from the projection $h^5$, and the spring $k^5$ is then allowed to force the shaft forward until its forward end strikes the beveled end of the detent K'. The forward movement of the shaft in this manner operates, it will be seen, to throw the said detent upward, thereby disengaging it from one of the notches $g^3$, and in this way unlocking the turn-table. Also the forward movement of the shaft causes its taper end portion to firmly engage in the square opening $k^2$ in the pinion K, and by then rotating the hand-wheel $k^7$ the operator can of course rotate the turn-table in either direction for the purpose of varying the angle of the blade. In this way therefore I provide an arrangement which enables the operator to both unlock and adjust the blade by manipulating a single hand-wheel. The arrangement is simple and effective and the universal joint $k^6$ permits the turn-table and blade to be adjusted laterally and vertically in the manner already described. After adjusting the blade to the desired angle the turn-table can then be relocked against further rotation by retracting the shaft sufficiently to again bring the arm $k^4$ back of one of the projections $h^5$ and so as to permit the detent K' to descend and engage a notch $g^3$ in the turn-table.

The improved spring device which I employ for facilitating the raising and lowering of the blade comprises a double crank L and a wheeled traveler L'. The said crank is pivoted to the sides of the body-frame in such manner that it swings about a transverse and horizontal axis, and the two crank-arms $l\ l$ are connected with the body-frame by means of coil-springs $l$ $l'$. The roll or wheel $l^2$ of the traveler is adapted and arranged to traverse the way afforded by the horizontal middle portion of the crank, and the rods $l^3$ connect the said traveler with the rear portion of the draw-bar H. It will be seen that the arrangement is such that the springs tend to draw the crank either upward or downward, according to whether the axis of the crank is below or above the springs, and consequently that the latter tend either to lift or depress the blade, except when the crank is on "deadcenter." For instance, in Fig. 1 the blade is lowered to a working position, the crank is below center, and the springs are therefore practically exerting a downward pull on the crank; but in lifting the blade it will be seen that the springs, as soon as the crank rises above center, then exert an upward pull on the crank and in this way assist in lifting the blade. The arrangement permits the turntable and blade to be swung freely from side to side, as the grooved roll $l^2$ is free to roll or travel along the way afforded by the horizontal middle portion of the crank, and furthermore it will be seen that with this arrangement the point at which the tension or pull of the springs is applied to the draw-bar is always at the center, or, in other words, that such point does not shift from side to side as a result of lateral swing or adjustment on the part of the draw-bar, turn-table, and blade. The coil-springs preferably have their forward ends secured to a cross bar or beam $a'$ of the body-frame A, and their rear ends are secured to lugs $l^4$ on the crank. The rods $l^3$ can be attached to any suitable portion of the draw-bar—as for instance, the housing $h^2$. (See Fig. 3.)

As a matter of further and special improvement I mount the long rear axle M in a sleeve or box M'. The said sleeve is pivotally connected at its middle with the body-frame, so as to swing horizontally, and its end portions are arranged to swing in guideways $a^2$. The said long rear axle, which is preferably square in cross-section, has its middle portion provided with teeth $m$. A pinion $m'$, mounted in bearings $m^2$, formed on the forward side of the sleeve, is arranged to engage the teeth on the axle and is provided with a longitudinal bore or opening $m^3$, which is preferably square. The hubs of the said pinion are extended through bars or beams $a^3$, forming part of the body-frame, and in this way the pinion serves as a pivot for the sleeve. A spring catch or dog $m^4$, having a portion $m^5$, which overhangs the opening $m^3$ is provided and arranged to lock the pinion against rotation. The device for skewing the rear axle comprises a rotary drum N and a chain N'. The said drum is mounted upon a transversely-arranged shaft $n$, which is supported in bearings on the frame. The middle portion of the chain is wound upon the drum and its end portions are secured to the opposite end portions of the sleeve. A worm $n'$, adapted to engage a worm-wheel $n^2$ on the shaft $n$, is provided for rotating the drum, and this worm is provided with a square opening or socket $n^3$, similar to the bore or opening in the pinion M. The hand-wheel O is provided with a shaft $o$, having its lower end squared to fit the socket in the worm, and by rotating this hand-wheel the chain can be wound in either direction and the axle thereby placed at the desired angle. This hand-wheel and its shaft can also be employed for rotating the pinion $m'$—that is to say, the squared end of the shaft $o$ can be made to fit both the socket of the worm and the bore or opening in the pinion, and by rotating the latter the rear end of the body-frame will of course be shifted laterally upon the long rear axle. This shifting of the frame upon the rear axle and also the skewing of the latter are for the purpose of varying the relative position of the rear wheels, according to the character of the work, and these adjustments and also those of the blade are all for purposes which will be readily understood by those skilled in the art.

For the purpose of reducing friction between the axle M and the sleeve M' and also between the said sleeve and the body-frame, I arrange a set of antifriction-balls 1 between the upper surface of the axle and the sleeve, and between each end of the sleeve and the body-frame I arrange a similar set of antifriction-balls 2. The upper surface of the axle and the opposing surface of the sleeve are formed with grooves or races in which the balls 1 work or travel, and the plate 3 serves to keep the balls separated and in their proper relative positions. The balls 2 are arranged between the upper surfaces of the end portions of the sleeve and the opposing surfaces of the guideways $a^2$, and it will be seen at this juncture that the grooves or races in which these balls travel or work are necessarily formed on the line of a circle having as its center the pinion which serves as a pivot for the sleeve. (See the right-hand end portion of the sleeve in Fig. 8.) The said balls 2 are therefore arranged to work in segmental or arc-shaped grooves, and these balls are also maintained in place by plates 4, which, like the plate 3, are loosely arranged and free to slide back and forth with the balls. In this way friction between the sleeve and axle is reduced by the interposed balls 1, and friction between the sleeve and the guideways $a^2$ is reduced by the interposed balls 2. A machine of this character is necessarily quite heavy, and the reduction of friction in this manner tends to render the adjustment of the rear axle comparatively easy and certain. It will be seen, therefore, that, broadly, I mount the rear axle in a sleeve having a pivotal connection with the body-frame, and that more specifically I provide a sleeve having a pivotal connection with the body-frame and having a ball-bearing connection with the inclosed rear axle;

also, that, broadly, I interpose antifriction-balls between the rear axle and the frame; that I provide a simple and highly-effective arrangement for skewing the long rear axle; that I provide an improved arrangement whereby the turn-table can be both unlocked and rotated by manipulating a single hand-wheel or other similar device; that, broadly, I support the blade from a swinging runway; that I have improved the mode of applying the floating springs, and also that I have provided a general arrangement which renders the machine comparatively easy of control and certain in its operation.

What I claim as my invention is—

1. A road-machine comprising a body-frame supported upon vehicle-wheels, a transversely-arranged track or way mounted upon said body-frame and movable up and down, and a scraper-blade suspended from said track or way and movable along the length of same.

2. The combination of a body-frame, a sleeve pivoted to the said frame, a long rear axle mounted in said sleeve, antifriction-balls interposed between the axle and sleeve, antifriction-balls interposed between the end portions of the sleeve and body-frame, means for sliding the sleeve along the said axle, and means for skewing the sleeve and axle.

3. In a road-machine, and in combination with the transversely-arranged scraper-blade, a sleeve having a pivotal connection with the body-frame, a long rear axle mounted in said sleeve, a chain-drum arranged in rear of said sleeve, a chain having its middle portion wound around said drum and its ends connected with the opposite end portions of said sleeve, means for rotating said drum for the purpose of skewing said sleeve and axle, and means for sliding the sleeve along the said axle.

4. In a road-machine, and in combination with the transversely-arranged scraper-blade, a long rear axle having a pivotal connection with the body-frame, a chain-drum arranged adjacent to said sleeve, a chain or like flexible connection having its middle portion wound around said drum and its ends suitably connected with the opposite end portions of said axle, and worm-gearing for rotating said drum for the purpose of skewing the said axle.

5. The combination of a long rear axle, a long sleeve which incloses the middle portion of said axle and which is slidably mounted upon the latter, the said sleeve being pivoted at its middle to the body-frame, a chain-drum arranged parallel with and in rear of said sleeve, a chain having its middle portion wound around said drum and its ends suitably connected with the opposite end portions of said sleeve, worm-gearing for rotating said drum for the purpose of skewing said sleeve and axle, means for sliding the sleeve along the axle, and means for locking the sleeve and axle against relative shift.

6. The combination of the sleeve which is pivoted to the body-frame, the long rear axle mounted in said sleeve and provided with teeth, a pinion arranged to engage said teeth and mounted in bearings on said sleeve, the hubs of the pinion extending through portions of the body-frame and the pinion in this way serving as a pivot for the sleeve, means for rotating the pinion for the purpose of sliding the sleeve along the axle, and means for skewing the sleeve and axle.

7. In combination with the vertically and laterally adjustable scraper-blade, a transversely-arranged double crank mounted upon the body-frame in such manner as to swing substantially up and down, floating springs for connecting the said crank with the body-frame, a traveler adapted and arranged to traverse the way afforded by the horizontal middle portion of said crank, and means for connecting said traveler with said blade.

8. In a road-machine, a laterally and vertically adjustable scraper-blade, a double crank arranged to swing substantially up and down in bearings on the body-frame, one or more springs for connecting the crank with the body-frame for the purpose set forth, a traveler having a grooved roll adapted and arranged to traverse the horizontal middle portion of said crank, and means for connecting said traveler with said blade.

9. In a road-machine, a rotatable turn-table from which the blade is suspended and which is provided with cogs or gear-teeth, a pinion arranged to engage said teeth, a shaft having a sliding connection with said pinion, a device for locking the turn-table against rotation, means whereby a longitudinal shift or end movement of said shaft will cause the said locking device to lock or unlock the turn-table, and means for rotating said shaft for the purpose of rotating said pinion and thereby rotating the said turn-table.

10. In a road-machine, a turn-table from which the scraper-blade is supported and which is provided with a segment, a pinion arranged to engage said segment, a shaft having a sliding engagement with said pinion, a locking device for locking the turn-table against rotation and arranged so as to be engaged by the end of said shaft, means for shifting said shaft longitudinally for the purpose of causing the locking device to lock or unlock the turn-table, and means for rotating said shaft for the purpose of rotating said pinion and thereby rotating said turn-table.

11. In a road-machine, a turn-table from which the scraper-blade is supported and which is provided with a segment, a pinion arranged to engage said segment, a swinging latch or detent which is arranged to engage notches in the turn-table and which has a beveled end, a shaft having a polygonal portion which slides in a polygonal opening in said pinion, means for shifting said shaft endwise for the purpose of causing its end to strike the beveled end of the detent and thereby unlock the turn-table, and means for rotating said shaft for the purpose of rotating said pinion and thereby rotating the turn-table.

12. The combination of a turn-table, a device for locking said turn-table against rotation, a device for rotating said turn-table, a shaft having a sliding engagement with said rotating device, means for shifting said shaft endwise for the purpose of causing it to engage and open said locking device, and means for rotating said shaft for the purpose of rotating the turn-table.

13. The combination of a turn-table having a segment and having also a series of notches, a draw-bar to which the turn-table is pivoted, a detent or catch pivoted to said draw-bar and adapted to engage said notches in the turn-table, said detent being provided with a beveled end, a pinion arranged to engage said segment, a shaft provided with an arm and having also a polygonal portion which slides in a polygonal opening in the pinion, a coil-spring arranged and tending to force the shaft forward against the beveled end of said detent, one or more stops for engaging the arm on the shaft for the purpose of maintaining the spring under compression and the end of the shaft out of engagement with the beveled end of the detent, means for rotating the shaft for the purpose of rotating the turn-table, and means for shifting the shaft endwise for the purpose of disengaging the arm and allowing the spring to force the shaft forward against the beveled end of the detent, substantially as set forth.

14. The combination of the draw-bar, turn-table, rack, pinion, shaft, detent, spring and bolt $g$, all constructed and organized substantially as and for the purposes set forth.

ORTUS E. MOATS.

Witnesses:
H. G. HOWELL,
J. M. SMART.